US006971159B2

(12) United States Patent
Gosis et al.

(10) Patent No.: US 6,971,159 B2
(45) Date of Patent: Dec. 6, 2005

(54) TOOL FOR INSERTING ELECTRICAL WIRES INTO AN ELECTRICAL CONNECTOR

(75) Inventors: Anatoly Gosis, Palatine, IL (US); James A. Turek, La Grange, IL (US)

(73) Assignee: Illinois Tool Works Inc, Glenview, IL (US)

( * ) Notice: Subject to any disclaimer, the term of this patent is extended or adjusted under 35 U.S.C. 154(b) by 481 days.

(21) Appl. No.: 10/074,631

(22) Filed: Feb. 12, 2002

(65) Prior Publication Data

US 2003/0150104 A1 Aug. 14, 2003

(51) Int. Cl.[7] ................................................ B23P 19/04
(52) U.S. Cl. ............................ 29/749; 29/753; 29/759; 29/760
(58) Field of Search .................. 29/749–753, 758–761, 29/566.3; 269/239, 270; 81/364

(56) References Cited

U.S. PATENT DOCUMENTS 3,864,802 A * 2/1975 Tucci ........................ 29/566.3
4,035,897 A * 7/1977 Over et al. .................. 29/56.6
4,519,129 A * 5/1985 Caveney et al. .............. 29/749
4,912,840 A * 4/1990 Pearce ......................... 29/749
5,074,032 A * 12/1991 Anderson ..................... 29/749
5,142,777 A * 9/1992 Boyer et al. .................. 29/884
5,412,862 A * 5/1995 Comerci et al. .............. 29/751

* cited by examiner

*Primary Examiner*—Minh Trinh
(74) *Attorney, Agent, or Firm*—Mark W. Croll; Paul F. Donovan

(57) ABSTRACT

A tool for inserting electrical wires into an electrical connector for mating with a plurality of electrical contact members fixedly mounted within the electrical connector comprises a base fixture upon which the electrical connector is to be installed, an insertion die holder upon which a set of insertion dies is mounted for encountering and forcing the plurality of electrical wires into the electrical connector, a driving assembly for moving the insertion die holder toward the base fixture so as to cause the set of insertion dies to force the plurality of electrical wires into the electrical connector and mate with the electrical contact members of the electrical connector, and structure fixedly mounted upon the base fixture for engaging the electrical connector so as to precisely locate and laterally immobilize the electrical connector upon the base fixture such that the set of insertion dies can accurately insert the electrical wires into said electrical connector.

5 Claims, 9 Drawing Sheets

TOOL FOR INSERTING ELECTRICAL WIRES INTO AN ELECTRICAL CONNECTOR

FIELD OF THE INVENTION

The present invention relates generally to an installation, insulation displacement, and terminating power tool for inserting a plurality of electrical wires into an electrical connector so as to electrically connect the plurality of electrical wires to electrical contact members disposed within the electrical connector, and more particularly to a new and improved installation, insulation displacement, and terminating power tool for inserting a plurality of electrical wires into an electrical connector so as to electrically connect the plurality of electrical wires to electrical contact members disposed within the electrical connector wherein the power tool is relatively compact in size in order to permit the same to be readily held or grasped by means of an operator's hand, and yet, the tool is powerful enough to develop the needed thrust forces in order to achieve the insertion and electrical connection of the plurality of electrical wires to the plurality of electrical contact blade members disposed within the electrical connector in accordance with insulation displacement techniques, and wherein further, the power tool is capable of achieving a quick-change replacement of its driven insertion tool assembly so as to enable the power tool to be operatively used in connection with the insertion and electrical connection of a plurality of electrical wires, to a plurality of electrical contact blade members, disposed within differently configured electrical connectors, or alternatively, to enable the replacement of the cutter blade component of the driven insertion tool assembly when, for example, the cutter blade component becomes worn and dull.

BACKGROUND OF THE INVENTION

Various tools are of course well-known in the PRIOR ART for accomplishing, for example, the insertion of a plurality of electrical wires into an electrical connector so as to achieve electrical connection of the plurality of electrical wires with a plurality of electrical contact blade members, disposed within the electrical connector, in accordance with insulation displacement techniques. Such PRIOR ART tools, devices, or implements usually suffer or exhibit operational drawbacks or disadvantages which has necessitated the development of a new and improved installation, insulation displacement, and terminating tool for inserting a plurality of electrical wires into an electrical connector so as to electrically connect the plurality of electrical wires to electrical contact members disposed within the electrical connector in accordance with insulation displacement techniques. For example, the PRIOR ART tools are not usually relatively small in size so as to enable the same to be readily held, grasped, or manipulated by means of an operator. Furthermore, when it has been attempted to construct PRIOR ART tools of the aforenoted type such that the tools have in fact been of relatively small size so as to be capable of being readily held, grasped, and manipulated by means of an operator, such tools have usually been unable to develop the sufficiently large thrust forces which are required in order to successfully achieve the insertion and electrical connection of the plurality of electrical wires to the plurality of electrical contact blade members, disposed within the electrical connector, in accordance with insulation displacement techniques. Still yet further, it has likewise been experienced that in order to, for example, replace the driven insertion tool assembly so as to enable the tool to be operatively used in connection with the insertion and electrical connection of a plurality of electrical wires, to a plurality of electrical contact blade members, disposed within differently configured electrical connectors, or alternatively, to enable the replacement of the cutter blade component of the driven insertion tool assembly when, for example, the cutter blade component becomes worn and dull, the process required for achieving such replacement of the driven insertion tool assembly within such PRIOR ART tools is quite tedious and time-consuming.

A need therefore exists in the art for a new and improved installation, insulation displacement, and terminating power tool for inserting a plurality of electrical wires into an electrical connector so as to electrically connect the plurality of electrical wires to electrical contact members disposed within the electrical connector wherein the tool is relatively compact in size in order to permit the same to be readily held or grasped by means of an operator's hand, and yet, the tool is powerful enough to develop the needed thrust forces in order to achieve the insertion and electrical connection of the plurality of electrical wires to the plurality of electrical contact blade members disposed within the electrical connector in accordance with insulation displacement techniques, and wherein further, the power tool is capable of achieving a quick-change replacement of its driven insertion tool assembly so as to enable the tool to be operatively used in connection with the insertion and electrical connection of a plurality of electrical wires, to a plurality of electrical contact blade members, disposed within differently configured electrical connectors, or alternatively, to enable the replacement of the cutter blade component of the driven insertion tool assembly when, for example, the cutter blade component becomes worn and dull. Power head can be used with a variety of insertion style tool to suit differing types of connectors.

OBJECTS OF THE INVENTION

Accordingly, it is an object of the present invention to provide a new and improved installation, insulation displacement, and terminating power tool for inserting a plurality of electrical wires into an electrical connector so as to electrically connect the plurality of electrical wires to a plurality of electrical contact members disposed within the electrical connector in accordance with insulation displacement techniques.

Another object of the present invention is to provide a new and improved installation, insulation displacement, and terminating power tool for inserting a plurality of electrical wires into an electrical connector so as to electrically connect the plurality of electrical wires to a plurality of electrical contact members disposed within the electrical connector in accordance with insulation displacement techniques, wherein the tool effectively overcomes the various operational drawbacks and disadvantages characteristic of the PRIOR ART installation tools and terminating tools.

An additional object of the present invention is to provide a new and improved installation, insulation displacement, and terminating power tool for inserting a plurality of electrical wires into an electrical connector so as to electrically connect the plurality of electrical wires to a plurality of electrical contact members disposed within the electrical connector in accordance with insulation displacement techniques, wherein the tool is relatively compact in size so as to readily enable the same to be held, grasped, and manipulated by operator personnel.

A further object of the present invention is to provide a new and improved installation, insulation displacement, and terminating power tool for inserting a plurality of electrical wires into an electrical connector so as to electrically connect the plurality of electrical wires to a plurality of electrical contact members disposed within the electrical connector in accordance with insulation displacement techniques, wherein the tool is relatively compact in size so as to readily enable the same to be held, grasped, and manipulated by operator personnel, and yet the tool is constructed in such a manner as to be powerful enough to develop a sufficient level of thrust forces which will enable the tool to successfully insert the plurality of electrical wires into the electrical connector and achieve the electrical connection of the plurality of electrical wires to the electrical contact members of the electrical connector in accordance with insulation displacement techniques.

A last object of the present invention is to provide a new and improved installation, insulation displacement, and terminating power tool for inserting a plurality of electrical wires into an electrical connector so as to electrically connect the plurality of electrical wires to a plurality of electrical contact members disposed within the electrical connector in accordance with insulation displacement techniques, and wherein further, the tool is capable of achieving a quick-change replacement of its driven insertion tool assembly so as to enable the tool to be operatively used in connection with the insertion and electrical connection of a plurality of electrical wires, to a plurality of electrical contact blade members, disposed within differently configured electrical connectors, or alternatively, to enable the replacement of the cutter blade component of the driven insertion tool assembly when, for example, the cutter blade component becomes worn and dull, whereby such replacement operations do not require substantial operational downtime.

SUMMARY OF THE INVENTION

The foregoing and other objectives are achieved in accordance with the teachings and principles of the present invention through the provision of a new and improved installation, insulation displacement, and terminating power tool, for inserting a plurality of electrical wires into an electrical connector so as to electrically connect the plurality of electrical wires to a plurality of electrical contact members disposed within the electrical connector in accordance with insulation displacement techniques, which comprises a base fixture or framework upon which an electrical connector is mounted while the electrical wires are being installed therein, a driven insertion tool set or assembly for actually installing or inserting the electrical wires into the electrical connector such that the electrical wires will be properly electrically connected to the electrical contact members disposed internally within the electrical connector, and an insertion tool driving assembly for driving the insertion tool set or assembly so as to achieve the installation or insertion of the electrical wires into the electrical connector. The driving assembly comprises a three-chamber piston-cylinder driving assembly for developing an enhanced level of thrust forces required to insert the wires into the electrical connector as well as to cause the insulation displacement connection therebetween, and the driven insertion tool set or assembly is fixedly mounted upon a holder mechanism which is removably mounted upon the driving assembly by means of a quick-release mechanism. In a similar manner, the driving assembly and the insertion punch or die set holder are also mounted upon the base fixture or framework by means of a relatively quick installation mechanism which includes a predetermined arrangement of parts for ensuring that the components parts are in fact properly and accurately oriented so as to achieve the installation and wire termination procedure. Means are also provided upon the base fixture or framework for effectively rigidly securing or immobilizing the electrical connector, and still further, an array of electrical connection pins are mounted within a header and are disposed in electrical connection with the contact members of the electrical connector so as to be capable of electrical connection to external testing equipment for testing the electrical integrity of the electrical connections established within the electrical connector as a result of the installation of the electrical wires therein.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE PREFERRED EMBODIMENT

Figure 1:
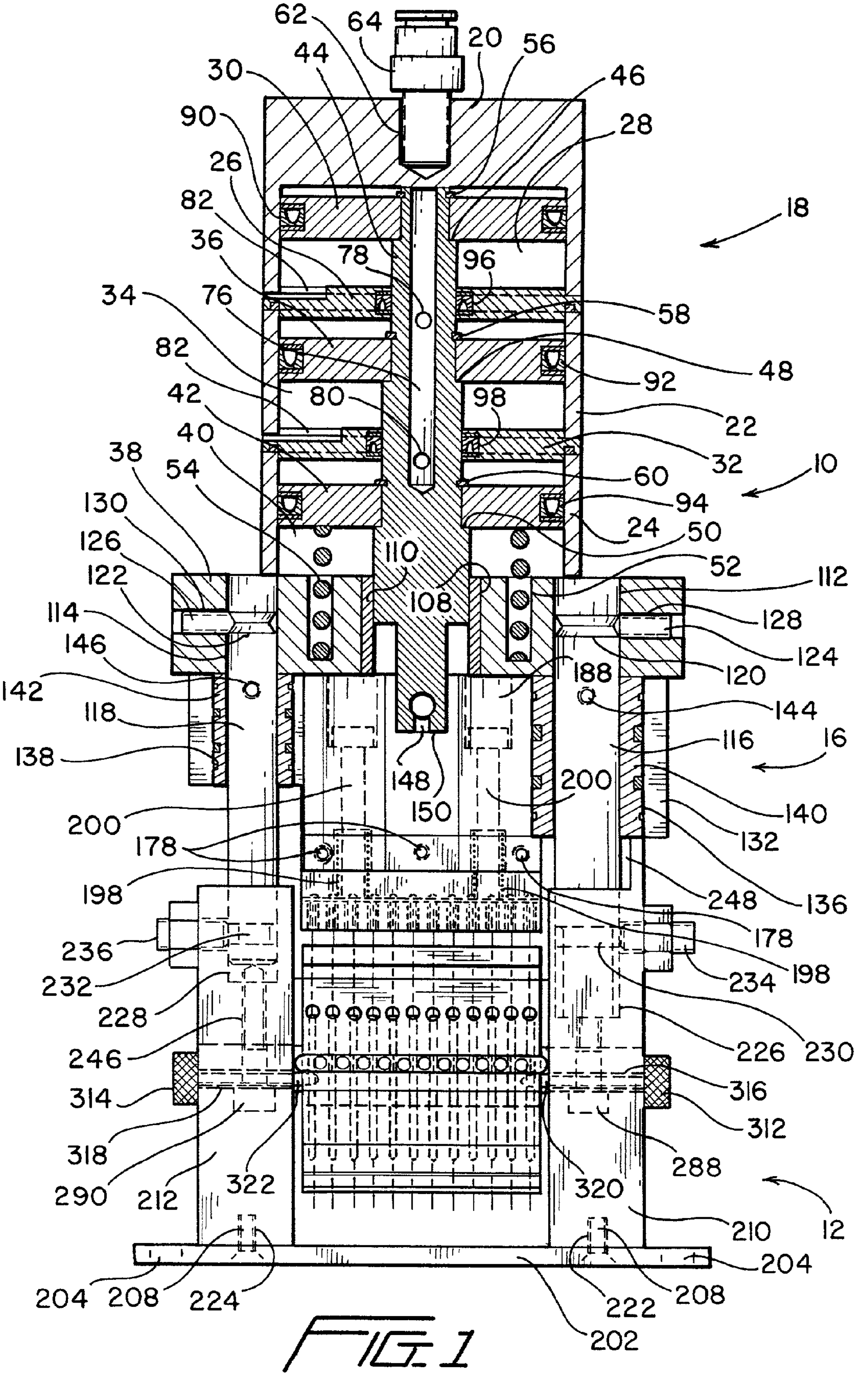
FIG. 1 is a front elevational view, partly in cross-section, of the new and improved installation, insulation displacement, and terminating power tool, for inserting electrical wires into, and for electrically connecting the electrical wires to electrical contact members disposed within, an electrical connector, as constructed in accordance with the principles and teachings of the present invention and showing the cooperative parts thereof.
Figure 2:
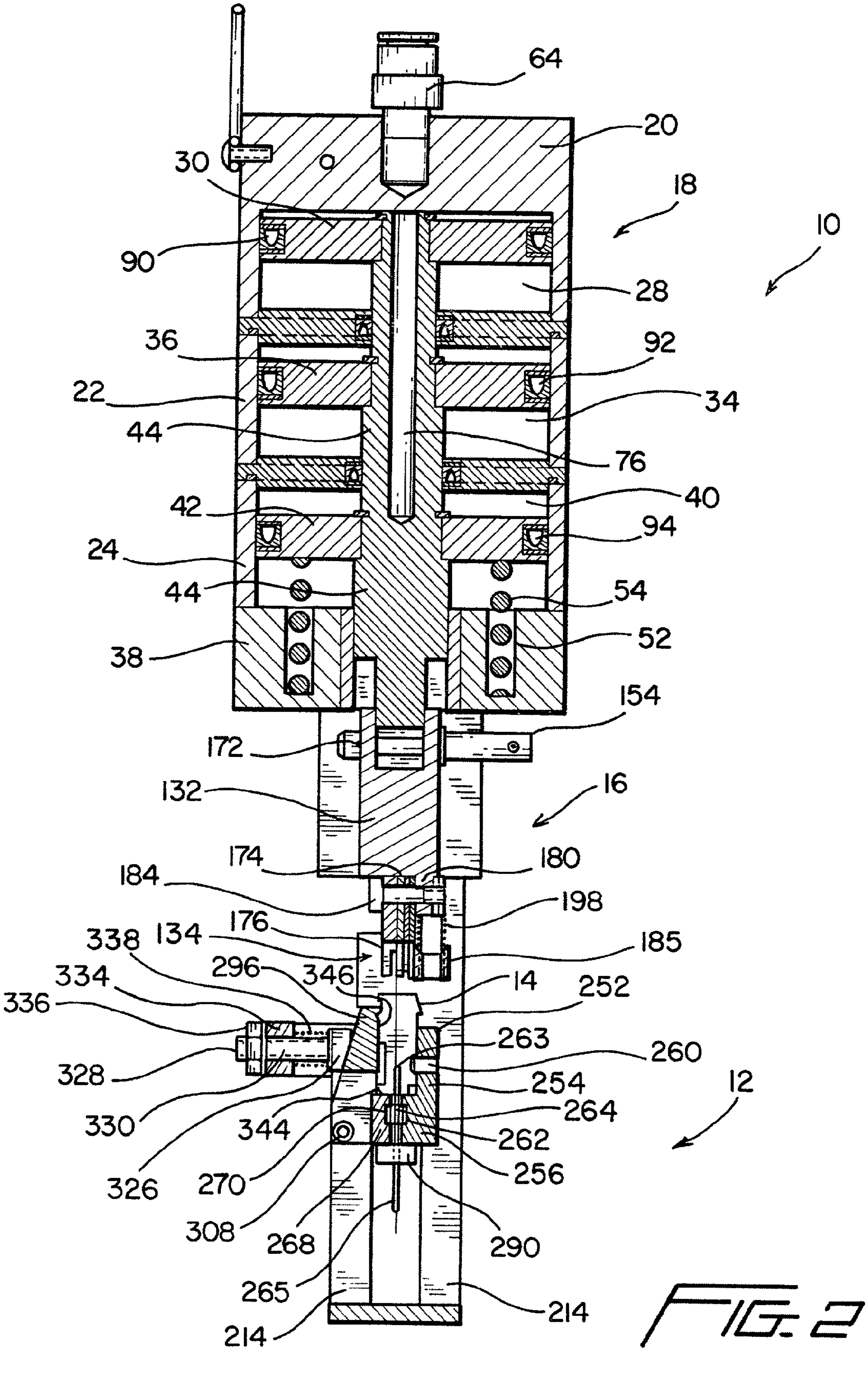
FIG. 2 is a left side elevational view of the new and improved installation, insulation displacement, and terminating tool illustrated in FIG. 1.
Figure 3:
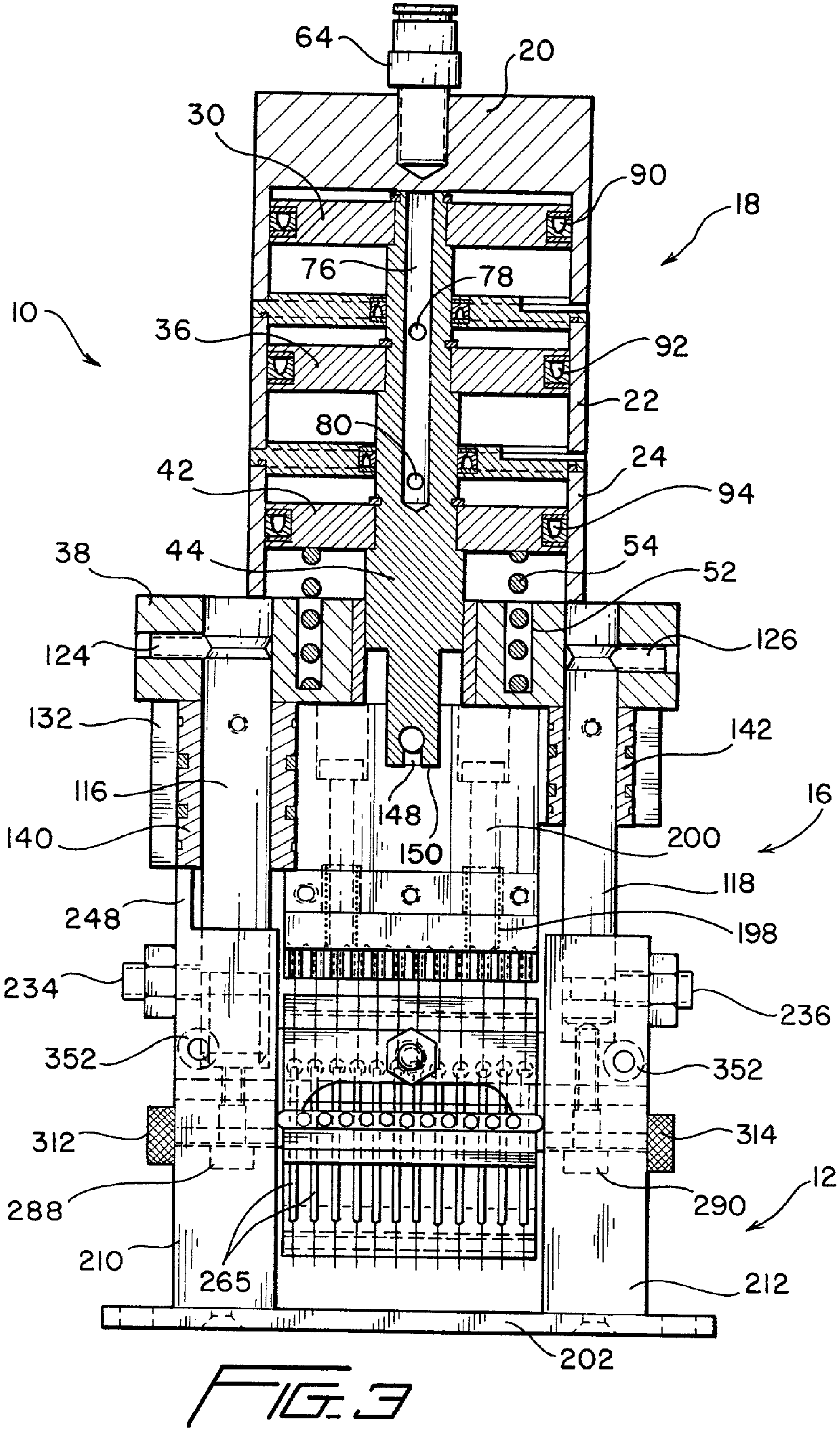
FIG. 3 is a rear elevational view of the new and improved installation, insulation displacement, and terminating tool illustrated in FIGS. 1 and 2.

Referring now to the drawings, and more particularly to FIGS. 1–3 thereof, the new and improved installation, insulation displacement, and terminating power tool, for inserting electrical wires into, and for electrically connecting the electrical wires to electrical contact members disposed within, an electrical connector, and as constructed in accordance with the principles and teachings of the present invention, is disclosed and is generally indicated by the reference character 10. More particularly, as best seen in FIG. 2, it is to be appreciated that the new and improved installation, insulation displacement, and terminating tool 10 comprises three major operative components, namely, a base fixture or framework 12 upon which an electrical connector 14 is mounted while the electrical wires are being installed therein, a driven insertion tool section 16 for actually installing or inserting the electrical wires into the electrical connector 14 such that the electrical wires will be properly electrically connected to the electrical contact members disposed internally within the electrical connector, and an insertion tool driving assembly 18 for driving the insertion tool section 16 so as to achieve the installation or insertion of the electrical wires into the electrical connector 14. As can readily be appreciated from any one of FIGS. 1–3, and in accordance with a unique and novel feature characteristic of the present invention, it is seen that the insertion tool driver assembly 18 comprises, in effect, a three-chamber pneumatic or air-actuated piston-cylinder assembly whereby, for example, a force of eleven hundred pounds (1100#) can be produced so as to in fact be capable of driving the insertion tool section 16 such that the installation or insertion of the electrical wires into the electrical connector 14, in accordance with insulation displacement techniques, can be readily achieved.

More particularly, it is seen that the three-chamber pneumatic or air-actuated piston-cylinder assembly 18 comprises a first chamber pneumatic or air cylinder housing section 20, a second chamber pneumatic or air cylinder housing section 22, and a third chamber pneumatic or air cylinder housing section 24. A first divider 26 is fixedly interposed between the lower end of the first chamber cylinder housing section 20 and the upper end of the second chamber cylinder housing section 22 so as to effectively define, along with the first chamber cylinder housing section 20, a first piston chamber 28 within which a first piston member 30 is adapted to be reciprocally disposed, a second divider 32 is fixedly interposed between the lower end of the second chamber cylinder housing section 22 and the upper end of the third chamber cylinder housing section 24 so as to effectively define, along with the second chamber cylinder housing section 22, a second piston chamber 34 within which a second piston member 36 is adapted to be reciprocally disposed, and a mounting plate 38 is fixedly disposed beneath the lower end of the third chamber cylinder housing section 24 so as to effectively define, along with the third chamber cylinder housing section 24, a third piston chamber 40 within which a third piston member 42 is adapted to be reciprocally disposed. The three piston members 30,36,42 are fixedly mounted upon a piston rod 44 which is diametrically stepped at predetermined axial positions so as to respectively define shoulder portions 46, 48,50 upon which the three piston members 30,36,42 are seated, and in this manner, when the three piston members 30,36,42 are caused to be moved vertically downwardly under the influence of the pneumatic or air-driving forces, as will become more apparent hereinafter, the piston rod 44 will be moved downwardly. In a similar manner, the mounting plate 38 is provided with an annular recess or pocket 52 within which the lower end of an annular coil spring 54 is disposed, and it is seen that the upper end of the coil spring 54 is disposed in contact with the undersurface portion of the third piston member 42. In this manner, when the pneumatic or air-driving forces are terminated, the coil spring 54 will force the third piston member 42 vertically upwardly, and the third piston member 42 will cause the piston rod 44 to move vertically upwardly so as to, in turn, cause the first and second piston members 30,36 to move upwardly simultaneously therewith. In order to transmit such vertical forces, as well as to lockingly retain the three piston members 30,36,42 at their seated positions upon the shoulder portions 46,48,50 of the piston rod 44, and still further, in order to lockingly retain the piston rod 44 at its predetermined axial position with respect to the three piston members 30,36,42 so as to effectively prevent the piston rod 44 from moving axially downwardly with respect to the three piston members 30,36,42, annular retainers 56,58,60 are respectively fixedly mounted upon the piston rod 44 at axial positions located immediately above each one of the three piston members 30,36,42.

With additional reference being made to FIGS. 4–7, in order to provide the pneumatic or driving air to the aforenoted three-chamber pneumatic or air-actuated piston-cylinder assembly 18, the upper axially central portion of the first chamber cylinder housing section 20 is provided with a vertically disposed or oriented bore or main air port 62 within which an air fitting connector 64 is adapted to be disposed. The first chamber cylinder housing section 20 is additionally provided with a first horizontally disposed bore 66 which is disposed at an angle A of 45° with respect to a side portion of the first chamber housing section 20 and which is adapted to be fluidically connected at an internal end portion thereof to the vertically oriented main air port 62 through means of a first connection passageway 68. A second horizontally disposed bore 70 is also provided within the first chamber housing section 20, and the second horizontally disposed bore 70 is adapted to be fluidically connected to the first horizontally disposed bore 66 by means of a second connection passageway 72.

Figure 7:
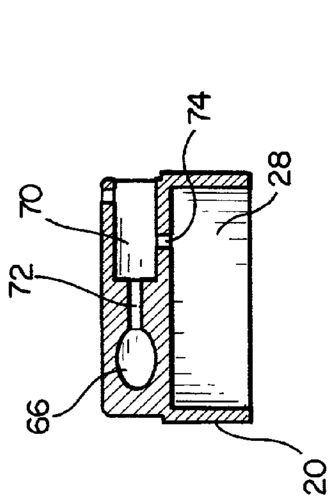
FIG. 7 is a cross-sectional view of the first chamber cylinder housing section disclosed within FIG. 4 and as taken along lines 7—7 of FIG. 4.
Figure 35:
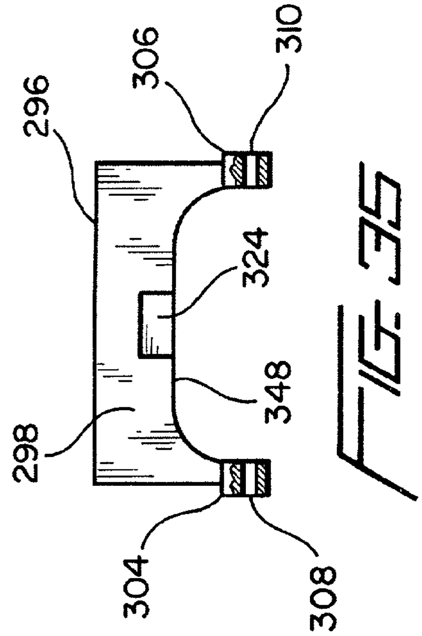
FIG. 35 is a rear elevational view of a cutter blade element utilized upon the tool of the present invention in connection with the electrical wire termination of an end-type electrical connector.

As best seen in FIG. 7, an air cylinder port 74, which is fluidically connected to the second horizontally disposed bore 70, is defined within a portion of the first chamber housing section 20 which effectively forms the upper cylinder wall of the first chamber cylinder housing section 20 defining the first piston chamber 28. The first horizontally disposed bore 66 is adapted to have a first finger-operated valve member 73 operatively disposed therein so as to control the flow of air from the main air port 62 and first connection passageway 68 into the second connection passageway 72 when the first valve member 73 is actuated, and the second horizontally disposed bore 70 is likewise adapted to have a second finger-operated valve member 75 operatively disposed therein so as to likewise control the flow of air from the second connection passageway 72 and bore 70 to the cylinder air port 74 in order to provide actuating air into the first piston chamber 28. The provision of the first and second valve members 73,75 within the first and second bores 66,70 comprises a safety feature by means of which the inadvertent operation of the pneumatically operated tool 10 cannot be readily performed. It is noted further that the first and second finger-operated valve members 73,75 may comprise conventional two-position, spring-biased valve members.

When the three-chamber piston-cylinder assembly 18 is disposed in its non-actuated state, as disclosed within FIGS. 1–3, it is noted that the upper end of the piston rod 44 engages the upper cylinder wall of the first chamber cylinder housing section 20 defining the first piston chamber 28 such that the upper surface of the first piston member 30 is spaced below the upper cylinder wall of the first chamber cylinder housing section 20. In this manner, the air flowing through cylinder air port 74 is permitted to enter the upper portion of the first piston chamber 28 so as to begin forcing the three-chamber piston-piston rod assembly 30,36,42,44 downwardly. It is noted further that the piston rod 44 is provided with a blind bore 76 which extends axially inwardly from the upper end of the piston rod 44, and still further, the piston rod 44 is provided with a pair of radially extending bores 78,80 which respectively fluidically communicate with the upper portions of the second and third piston chambers 34,40. In this manner, when the three-chamber piston-piston rod assembly 30,36,42,44 begins to be moved downwardly as a result of the incoming air from cylinder air port 74 impacting upon the upper surface of the first piston member 30, the upper end of the piston 44 will be displaced from its engaged position with respect to the upper cylinder wall of the first chamber cylinder housing section 20 thereby effectively uncovering the upper open end of the axially oriented bore 76. Accordingly, the incoming air from cylinder air port 74 can now enter axially oriented bore 76, as well as radially oriented bores 78,80, such that the air can now impact against the upper surfaces of the second and third piston members 36,42 and thereby enhance the downward driving of the three-chamber piston-piston rod assembly 30,36,42,44.

Figure 8:
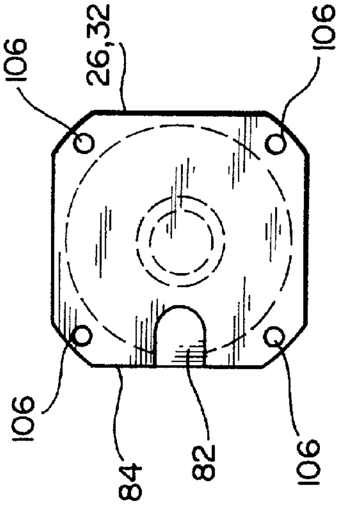
FIG. 8 is a top plan view of a divider element which may be used either between the first and second chamber cylinder housing sections or between the second and third chamber cylinder housing sections.

As is well-known in connection with actuating or driving piston-cylinder assemblies, when, for example, an actuating fluid impacts upon a first side of a piston, fluid must be simultaneously exhausted from a second opposite side of the piston in order to in fact permit the piston to move. If such were not the case, the piston would in effect be locked in position within the cylinder whereby movement of the piston would not be able to be achieved. Accordingly, exhaust ports or the like must be effectively provided in connection with each one of the piston chambers 28,34,40 in order to permit the respective pistons 30,36,42 to move within the piston chambers 28,34,40. As can therefore be seen from FIG. 8, each one of the first and second dividers 26,32 is provided with a substantially radially extending, recessed portion 82 upon the upper surface thereof such that the recessed portion 82 extends from a region internally within the respective one of the piston chambers 28,34 to the outer peripheral edge portion 84 of the respective one of the first and second dividers 26,32, as can also be appreciated from FIGS. 1 and 3, so as to effectively define an exhaust passage for permitting the air, disposed below the respective one of the pistons 30,36, to escape into the atmosphere. It is to be noted for the purposes of this discussion, the only significant difference between the first and second dividers 26,32 resides in the size of the central apertures formed therein so as to respectively accommodate the different outer diameter portions of the stepped piston rod 44 with which the first and second dividers 26,32 are operatively associated.

Figure 9:
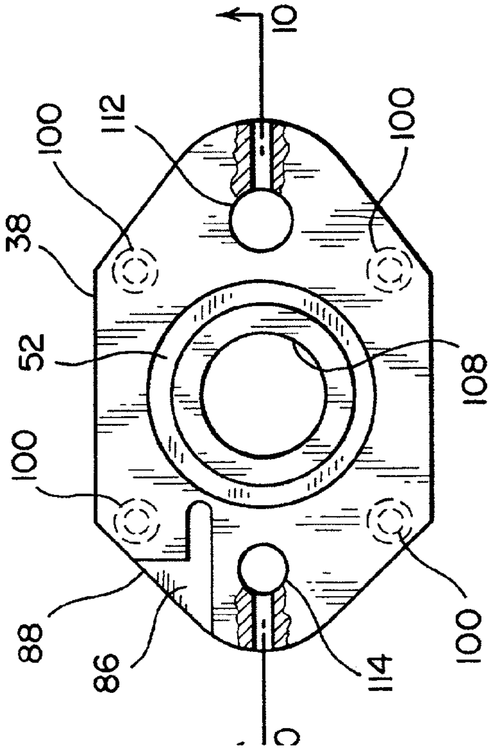
FIG. 9 is a top plan view of the mounting plate element upon which the three-chamber piston-cylinder assembly is supported.

In a similar manner, as can likewise be appreciated from FIG. 9, the mounting plate 38 is provided with a substantially radially oriented, recessed portion 86 upon the upper surface thereof such that the recessed portion 86 extends from a region internally within the piston chamber 40 to an outer peripheral edge portion 88 of the mounting plate 38 so as to effectively define an exhaust passage for permitting the air, disposed below the piston 42, to escape into the atmosphere. When the piston-piston rod assembly 30, 36,42,44 is moved upwardly under the biasing influence of the coil spring 54 and when the supply of air from air fitting 64 is terminated, the air disposed above each one of the pistons 30,36,42 is able to be exhausted through means of the apertures or bores 80,78,76, and 74 as a result of the first and second flow control valves 73,75 now being disposed in their normal, non-actuated positions or states. As can also be appreciated from FIGS. 1–3, the outer peripheral edge portion of each one of the pistons 30,36,42 is respectively provided with a suitable piston sealing ring 90,92,94 for providing a fluid sealing function with respect to the internal side wall portions of the first, second, and third chamber cylinder housing sections 20,22,24, and in a similar manner, the inner peripheral edge portion of each one of the first and second dividers 26,32 is respectively provided with a suitable sealing ring 96,98 for providing a fluid sealing function with respect to the external portion of the piston rod 44 with which the particular one of the first and second dividers 26,32 is operatively associated.

Figure 11:
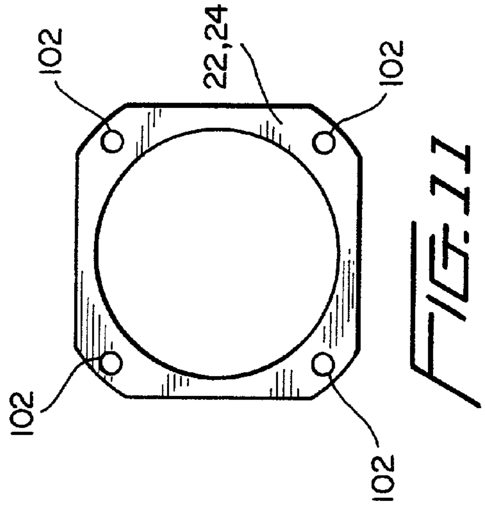
FIG. 11 is a top plan view of a cylinder housing section which may comprise either one of the second or third chamber cylinder housing sections.
Figure 5:
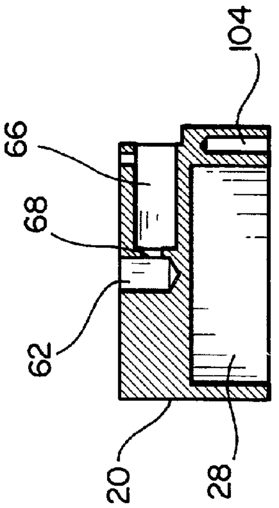
FIG. 5 is a cross-sectional view of the first chamber cylinder housing section disclosed within FIG. 4 and as taken along lines 5—5 of FIG. 4.
Figure 6:
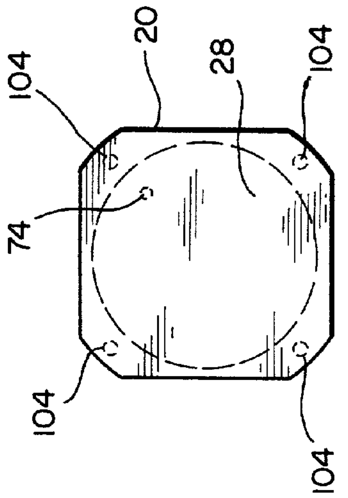
FIG. 6 is a bottom plan view of the first chamber cylinder housing section as disclosed within FIG. 4.
Figure 4:
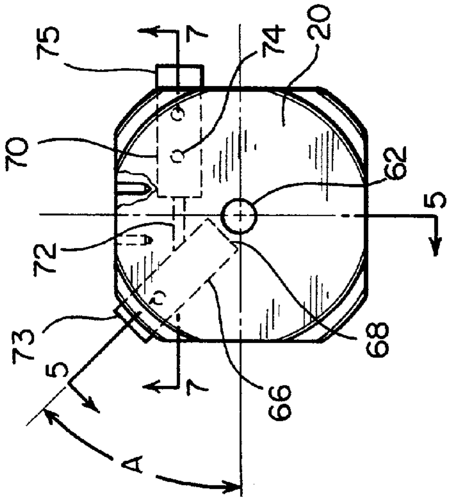
FIG. 4 is a top plan view of the first stage cylinder housing section of the new and improved installation, insulation displacement, and terminating tool as disclosed within FIGS. 1–3.
Figure 10:
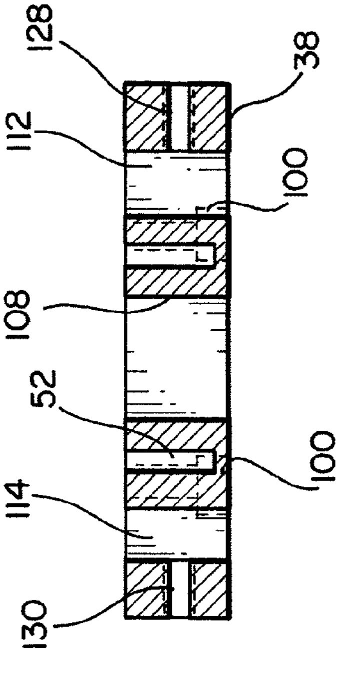
FIG. 10 is a cross-sectional view of the mounting plate element shown in FIG. 9 as taken along the lines 10—10 of FIG. 9.

Lastly, in connection with the three-chamber piston-cylinder insertion tool driving assembly 18, in order to fixedly secure the mounting plate 38 and the first, second, and third chamber cylinder housing sections 20,22,24 together, a plurality of shoulder bolt fasteners, not shown, are utilized. More particularly, as can best be seen from FIGS. 9 and 10, peripheral portions of the mounting plate 38 are provided with a plurality of counterbored holes 100 arranged within a substantially square array and within which, for example, the head and lower shank portions of the shoulder bolt fasteners, not shown, are to be disposed. In a similar manner, as can best be seen in FIG. 11, peripheral corner regions of each one of the second and third chamber cylinder housing sections 22,24 are provided with a plurality of bores 102 which are also arranged within a corresponding substantially square array through which the shank portions of the shoulder bolt fasteners pass, and still yet further, as can best be seen in FIGS. 5 and 6, peripheral corner regions of the first chamber cylinder housing section 20 are provided with a plurality of internally threaded bores 104, which are also arranged within a corresponding substantially square array, for receiving the threaded ends of the shoulder bolt fasteners. Correspondingly, as can be appreciated from FIG. 8, the corner peripheral regions of each one of the dividers 26,32 are likewise provided with a plurality of bores 106, arranged within a substantially square array, for permitting the shank portions of the shoulder bolt fasteners to pass therethrough.

In order to complete the construction of the three-chamber piston-cylinder insertion tool driving assembly 18, it is further seen from FIGS. 1, 3, 9 and 10 that the mounting plate 38 is provided with a vertically oriented central opening or through-bore 108 within which there is disposed a bearing member 110 through which the lower end of the piston rod 44 is guided while undergoing its vertically reciprocal movements. Still further, the mounting plate 38 is provided with a pair of additional vertically oriented through-bores 112,114 within which the upper ends of a pair of vertically oriented guide rods or guide pins 116,118 are respectively disposed. As can best be seen from FIGS. 1 and 3, the upper end portions of the guide rods or pins 116, 118 are respectively provided with annularly or peripherally extending grooves 120,122 within which a pair of set screws 124,126 are adapted to be seated. More particularly, the mounting plate 38 is further provided with a pair of radially oriented internally threaded bores 128,130 within which the set screws 124,126 are adjustably disposed, and accordingly, when the set screws 124,126 are fully threadedly engaged within the threaded bores 128,130, the set screws 124, 126 will fixedly retain the guide rods or pins 116,118 at their mounted positions within the mounting plate 38. The vertically oriented guide rods or pins 116,118 are adapted to guide the vertical reciprocal movements of a punch or die set holder 132 upon which a plurality of predeterminedly configured insertion dies or punches 134 are mounted, as best seen in FIG. 2, for inserting a plurality of electrical wires into the predeterminedly configured arrangement of electrical contact members of the electrical connector 14 in a manner which will be described hereinafter.

Figure 13:
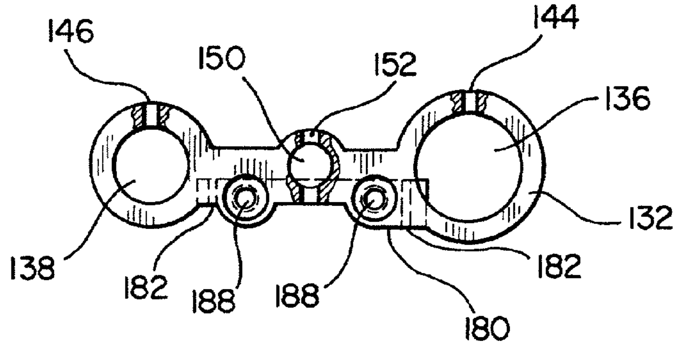
FIG. 13 is a top plan view, partly in cross-section, of the punch or die set holder disclosed within FIG. 12.
Figure 37:
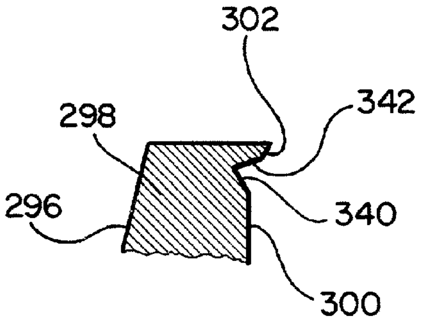
FIG. 37 is an enlarged detail view of the circled region E shown in FIG. 36.
Figure 12:
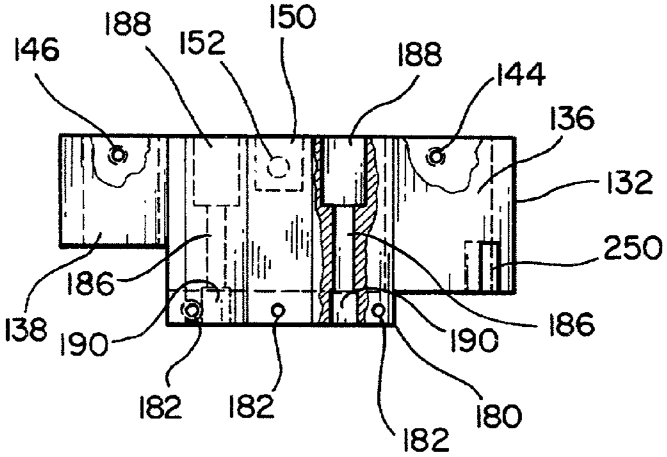
FIG. 12 is a side elevational view, partly in cross-section, of the punch or die set holder.
Figure 36:
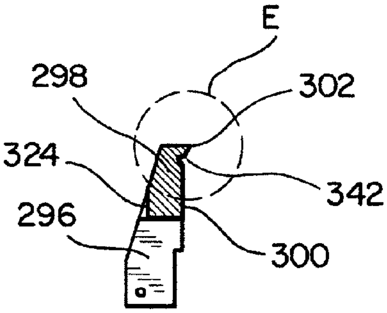
FIG. 36 is a side elevational view, partly in cross-section, of the cutter blade element shown in FIG. 35.
Figure 14:
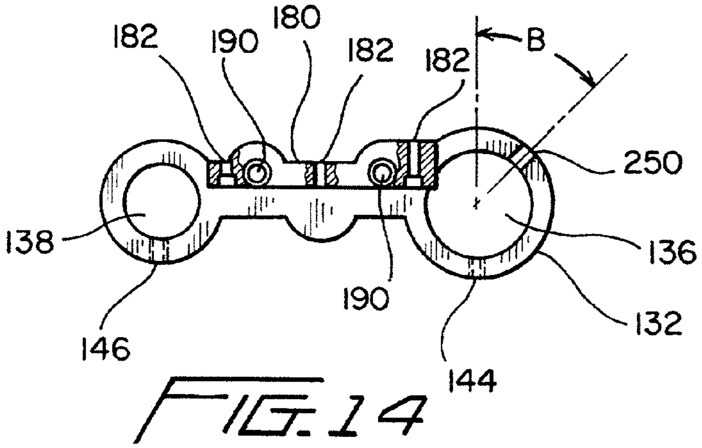
FIG. 14 is a bottom plan view, partly in cross-section, of the punch or die set holder disclosed within FIGS. 12 and 13.

As disclosed within FIGS. 1 and 3, as well as within FIGS. 12–14, the punch or die set holder 132 is provided with a pair of through-bores 136,138 within which cylindrical bearing members 140,142 are respectively fixedly disposed so as to permit the punch or die set holder 132 to undergo vertical slidable movements along the guide rods or pins 116,118. Upper portions of the cylindrical walls of the punch or die set holder 132 which define the through-bores 136,138 are provided with radially extending bores 144,146 within which set screws, not shown, are adapted to be disposed so as to maintain the bearing members 140,142 fixedly secured within the through-bores 136,138 of the punch or die set holder 132. It is noted that the diametrical extent of guide rod or pin 116 is greater than that of guide rod or pin 118, and that the diametrical extents of the through-bore 136 and bearing member 140 are greater than those of the through-bore 138 and bearing member 142. Such structure effectively defines a safety feature such that the punch or die set holder 132 can only be fixedly mounted upon the insertion tool driving assembly 18 in a particular orientation which automatically ensures the proper operative mating or engagement of the plurality of predeterminedly configured insertion dies or punches 134, as mounted upon the punch or die set holder 132, with the predeterminedly configured electrical contact members of the electrical connector 14. The punch or die set holder 132 is adapted to be fixedly mounted upon the lower end portion of the piston rod 44 such that the vertically reciprocal movements of the piston rod 44, as determined by means of the downward pneumatic or air-driven extension operation of the same, or alternatively, the upward spring-biased retracted operation of the same, are effectively translated into corresponding movements of the punch or die set holder 132. In accordance with another unique and novel structural feature characteristic of the present invention, however, the vertically slidable punch or die set holder 132 can also be readily and easily removed from the lower end portion of the piston rod 44 by means of a quick-change or quick-release mechanism when it is so desired, such as, for example, when a differently configured set of insertion dies or punches 134 is to be installed upon the punch or die set holder 132 so as to achieve the insertion of electrical wires into a differently configured electrical connector 14, or alternatively, when it is necessary to replace the cutter element operatively associated with the insertion dies or punches 134 as a result of the original cutter element becoming worn.

More particularly, as shown in FIGS. 1 and 3, it is seen that the lower end portion of the piston rod 44 has a horizontally extending key-hole shaped through-bore 148, and that an upper central region of the punch or die set holder 132 is provided with a vertically oriented blind recess, bore, or pocket 150, as can also be seen within FIGS. 12 and 13, within which the lower end portion of the piston rod 44 is adapted to be disposed. A horizontally oriented through-bore 152 is also provided within the upper central region of the punch or die set holder 132 so as to intersect or cross the blind bore or pocket 150, and a quick-release locking pin 154, as shown in FIGS. 2, 15 and 16, is adapted to be disposed within the horizontally oriented through-bore 152 so as to lockingly retain or mount the punch or die set holder 132 upon the lower end portion of the piston rod 44.

Figure 16:
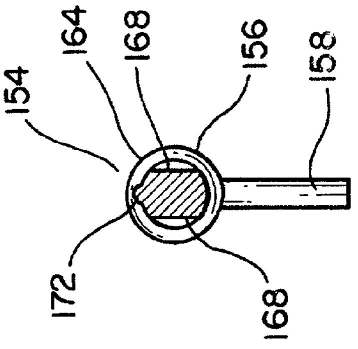
FIG. 16 is a cross-sectional view of the quick-release locking pin disclosed within FIG. 15 as taken along the lines 16—16 of FIG. 15.
Figure 24:
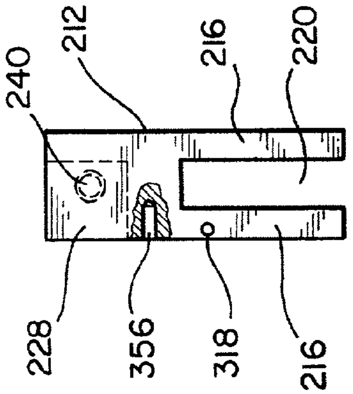
FIG. 24 is a side elevational view of a second one of the upstanding supports affixed to the framework or fixture support plate of FIG. 19 and used, together with the first upstanding support, for mounting the electrical connector, and the punch set or die holder and driving assembly thereon.
Figure 26:
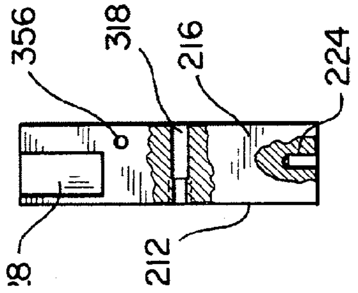
FIG. 26 is a rear elevational view, partly in cross-section, of the upstanding support shown in FIGS. 24 and 25.
Figure 15:
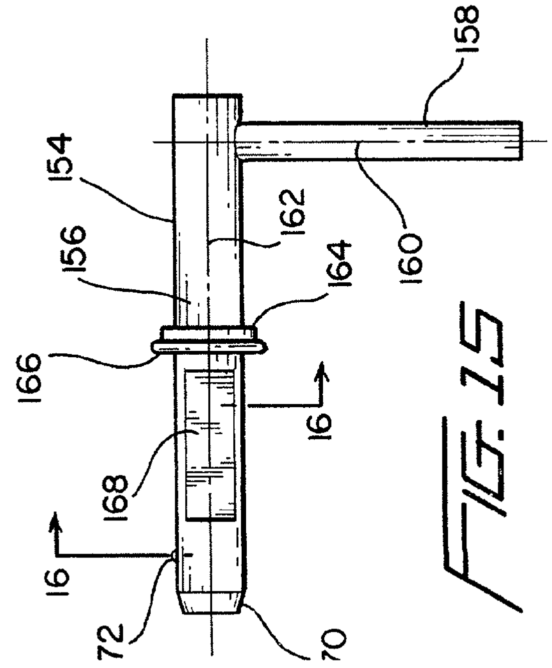
FIG. 15 is a side elevational view of the quick-release locking pin for lockingly retaining punch or die set holder upon the lower end portion of the piston rod.
Figure 22:
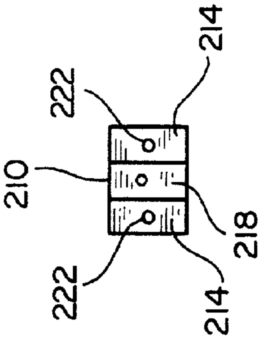
FIG. 22 is a bottom plan view of the upstanding support shown in FIGS. 20 and 21.
Figure 23:
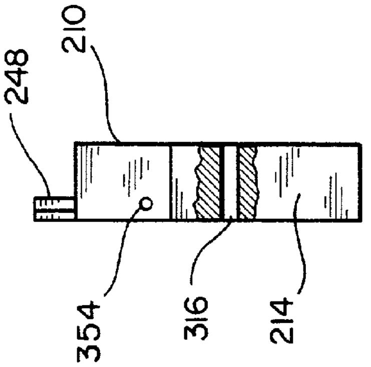
FIG. 23 is a rear elevational view, partly in cross-section, of the upstanding support shown in FIGS. 20–22.

As can best be seen from FIGS. 15 and 16, the quick-release locking pin 154 comprises a cylindrical shaft portion 156 upon one end of which there is fixedly disposed a dependent handle 158 wherein the longitudinal axis 160 of the handle 158 is disposed perpendicular to the longitudinal axis 162 of the shaft portion 156. An annular flanged portion or collar 164 is integrally fixed at a substantially axially central region of the shaft portion 156, and an annular O-ring member 166 is disposed around the shaft portion 156 so as to be disposed in abutment with the flanged portion or collar 164. A pair of flat portions 168, 168 are formed upon opposite sides of the shaft portion 156 between the O-ring ring member 166 and the tip portion 170 of the pin shaft 156, and it is to be appreciated that the flat portions 168,168 are disposed within planes which are disposed parallel to the plane within which the handle 158 is disposed. In a similar manner, a spring-biased detent button 172 is mounted upon an upper surface portion of the pin shaft 156 so as to be disposed within the same plane as the handle 158. Accordingly, when the punch or die set holder 132 is to be fixedly mounted upon the insertion tool driving assembly 18, the punch or die set holder 132 is initially movably mounted onto the guide rods 116,118 of the mounting plate 38 by effectively inserting the guide rods 116,118 through the bearing members 140,142 of the punch or die set holder 132. At this time, the handle 158 is mounted within the bore 152 of the punch or die set holder 132 so as to be oriented vertically downwardly whereby it is known that the flat portions 168,168 are likewise disposed within vertically oriented planes, and the spring-biased detent button 172 is also biased radially inwardly as a result of encountering the interior wall surface of the bore 152. Therefore, when the punch or die set holder 132 is fully mounted at its uppermost position upon the guide rods 116,118, at which position the upper surface portion of the punch or die set holder 132 will abut the undersurface portion of the mounting plate 38, the lower end or tip portion of the piston rod 44 will have entered the recess or pocket 150 defined within the punch or die set holder 132 while simultaneously therewith, the flat portions 168,168 will have passed through the narrow slot portion of the key-shaped aperture or hole 148 defined within the lower end or tip portion of the piston rod 44.

If the handle portion 158 of the quick-release locking pin 154 is now pushed slightly axially inwardly such that the O-ring member 166 is slightly axially compressed, the spring-biased detent button 172 will have passed entirely through the bore 152 and will emerge therefrom upon the opposite rear side of the punch or die set holder 132 so as to effectively engage the rear surface of the punch or die set holder 132. If the handle portion 158 is also substantially simultaneously rotated through an angular displacement of a quarter-turn or 90°, the full diametrical extent of the shaft portion 156 will now be disposed adjacent to the narrow slot portion of the key-shaped hole or aperture 148 formed within the lower end portion of the piston rod 44 so as to effectively prevent the passage back through such narrow slot portion of the key-shaped hole or aperture 148 of the shaft portion 156 of the quick-release locking pin 154. Accordingly, the punch or die set holder 132 is now fixedly disposed in its LOCKED state upon the insertion tool driving assembly 18, and if, when desired, the handle portion 158 of the quick-release locking pin 154 is rotated through an angular displacement of 90° in the reverse direction, the punch or die set holder 132 can be quickly disposed in its RELEASED state with respect to the insertion tool driving assembly 18.

As has been noted hereinbefore, the punch or die set holder 132 is adapted to fixedly mount thereon the set of punches or dies 134 which are to be utilized in connection with the insertion of the plurality of electrical wires into the electrical connector 14 which is mounted upon the base fixture or framework 12. As can best be seen from FIG. 2, the set of punches or dies 134 can comprise, for example, three insertion dies or punches 174 and a cutter die or element 176, and it is to be noted that the particular length, width, depth, shape, and lateral spatial arrangement of the individual prongs or tines comprising the insertion dies or punches 174 and the cutter die or element 176 can be varied in order to suit, or be adapted to, a particular arrangement of electrical contact members disposed within the electrical connector 14 and in connection with which the electrical wires are to be inserted and installed. Accordingly, the particular structural details or the insertion dies or punches 174 and the cutter die or element 176 are not disclosed, however, for the purposes of the present invention disclosure, it can be appreciated from FIG. 1 that each one of the insertion dies or punches 174 and the cutter die or element 176 comprises a plate member within which a horizontally oriented array of three apertures 178 are formed.

As can additionally be appreciated from FIGS. 12–14, a dependent mounting block 180 portion is integrally formed upon the lower end portion of the punch or die set holder 132 and is correspondingly provided with a horizontally oriented array of three apertures 182. As can be seen in FIG. 2, a plurality of shoulder bolts 184, only one of which is shown, are threadedly engaged within the apertures 182 so as to fixedly mount the set of insertion dies or punches 174 and the cutter die or element 176 upon the mounting block 180. In a similar manner, the punch or die set holder 132 is also adapted to movably mount thereon an electrical connector retainer 185, as is also disclosed within FIGS. 17 and 18, which is provided for engaging the electrical connector 14 so as to retain the electrical connector 14 at its fixed position upon the framework or fixture 12 when the three-piston-piston rod-punch set holder assembly 30,36,42,44,132 is moved downwardly so as to install the plurality of electrical wires into the electrical connector 14, as well as to retain the electrical connector 14 at its fixed position upon the fixture or framework 12 when the three-chamber piston-piston rod-punch set holder assembly 30,36,42,44,132 is retracted upwardly after, or upon completion of, the installation of the plurality of electrical wires into the electrical connector 14.

Figure 17:
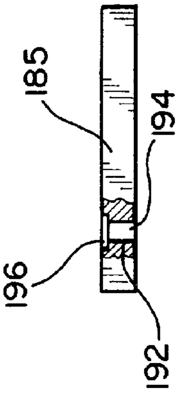
FIG. 17 is a side elevational view, partly in cross-section, of the electrical connector retainer component.
Figure 18:
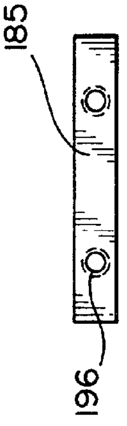
FIG. 18 is a top plan view of the electrical connector retainer component as disclosed within FIG. 17.
Figure 20:
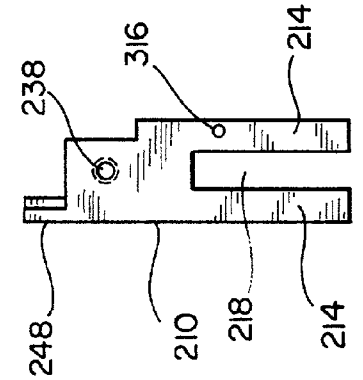
FIG. 20 is a side elevational view of a first one of the upstanding supports affixed to the framework or fixture support plate of FIG. 19 and used for mounting the electrical connector, and the punch set or die holder and driving assembly thereon.

Accordingly, as seen from FIGS. 12–14, the punch or die set holder 132 is further provided with a pair of vertically oriented through-bores 186 having first upper and second lower counterbored sections 188,190. As best seen in FIGS. 17 and 18, the electrical connector retainer 185 is provided with a pair of counterbored through-bores 192 wherein the lower section of each through-bore 192 is internally threaded as at 194 while the upper section of each through-bore 192 defines a seat 196 for the lower end portion of a biasing spring 198 which can be seen in FIGS. 1–3. The upper end portion of each biasing spring 198 is seated within the lower counterbored section 190 of each through-bore 186 formed within the punch or die set holder 132, and in this manner, when shoulder bolts 200, as best seen in FIGS. 1 and 3, are disposed within the through-bores 186 such that the head portions of the shoulder bolts 200 are disposed within the upper counterbored sections 188 while the lower threaded end portions of the shoulder bolts 200 are threadedly engaged within the threaded sections 194 of the through-bores 192 defined within the electrical retainer 185, the electrical retainer 185 will be resiliently disposed, as determined by means of the coiled biasing springs 198, at a position vertically spaced beneath the mounting block 180 of the punch or die set holder 132 so as to be capable of operatively interacting with the electrical connector 14 in the aforenoted manner. Specifically, the disposition and presence of the resilient biasing springs 198 enables the retainer 185 to undergo its relative independent movements with respect to the downwardly and upwardly moving set of insertion dies or punches 174 attendant the electrical wire installation process.

With reference now being made to FIGS. 1–3 and 19–28, the integrated structure comprising the base fixture of framework 12 will be described in detail. As seen in FIGS. 1–3 and 19, a base fixture or framework support plate 202 has a pair of apertures 204 defined within opposite ends thereof by means of which the base fixture or framework support plate 202 can be fixedly mounted upon a support surface, not shown. In addition, the support plate 202 is also provided with four counterbored apertures 206 which are arranged within a substantially rectangular array and through which a plurality of bolts 208 are adapted to be disposed so as to fixedly attach to the upper surface of the support plate 202 first and second upstanding supports 210,212. As can be readily appreciated from FIGS. 20–23 and FIGS. 24–28, the first and second upstanding supports 210,212 are substantially similar with respect to each other, however, they do comprise structural differences which will of course be dutifully noted. More particularly, it is seen that each one of the first and second upstanding supports 210,212 has a substantially inverted U-shaped configuration, when viewed from the side thereof, as defined by means of a pair of downwardly extending support legs 214,214 and 216,216, respectively, so as to further respectively define a slot or channel 218,220 therebetween. Each one of the support legs 214,214 and 216,216 of the upstanding supports 210,212 is provided with a threaded bore 222,222 and 224,224 within the lower end portions thereof and within which the bolts 208 are adapted to be threadedly disposed so as to in fact fixedly secure each one of the supports 210,212 to the support plate 202.

Figure 27:
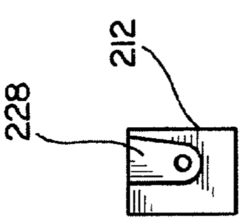
FIG. 27 is a top plan view of the upstanding support shown in FIGS. 24–26.
Figure 28:
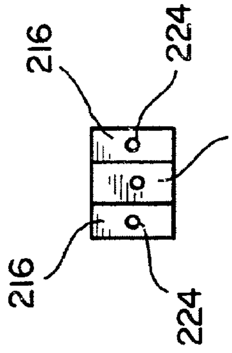
FIG. 28 is a bottom plan view of the upstanding support shown in FIGS. 24–27.
Figure 29:
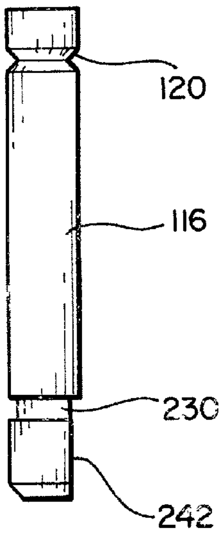
FIG. 29 is an elevational view of a first one of the guide rods as shown within FIGS. 1 and 3 upon which the punch or die set holder is movably guided.
Figure 33:
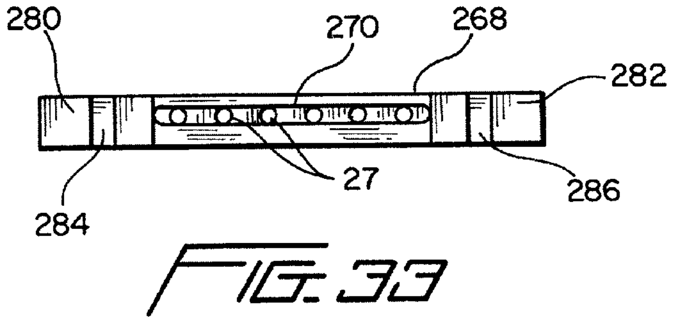
FIG. 33 is a front elevational view of a second support component for cooperating with the first support component disclosed within FIGS. 31 and 32 so as to mount the electrical pin connection header therebetween.
Figure 34:
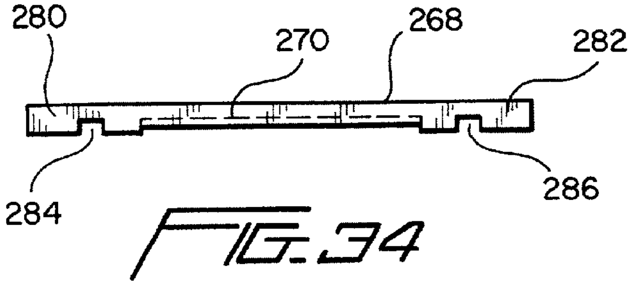
FIG. 34 is a top plan view of the second electrical pin connection header support component disclosed within FIG. 33.
Figure 30:
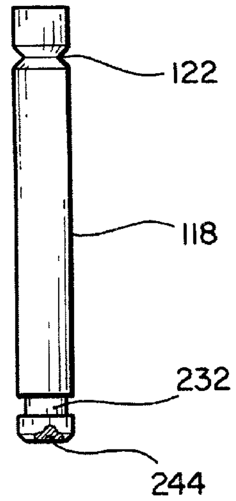
FIG. 30 is an elevational view of a second one of the guide rods as shown within FIGS. 1 and 3 upon which the punch or die set holder is movably guided.

Continuing still further, it is seen that each one of the upstanding supports 210,212 is further provided with a vertically oriented bore or socket 226,228 into which the lower end portions of the guide rods 116,118, upon which the punch or die set holder 132 is slidably guided in vertically reciprocal modes, are adapted to be disposed as can be appreciated from FIGS. 1 and 3. The socket 226 defined within the upstanding support 210 comprises a completely circular inner peripheral wall, however, the socket 228 defined within the upstanding support 212 has an inner peripheral wall which has a substantially U-shaped configuration as best seen in FIG. 27 with the rear wall portion of the socket 228 being open. In addition, as best seen in FIGS. 29 and 30, the guide rods 116,118 are respectively provided with an annularly recessed region 230,232 within the vicinity of the lower end tip portions thereof wherein such annularly recessed regions 230,232 are respectively adapted to be engaged by means of set screws 234,236, as shown within FIGS. 1 and 3, which are inserted within bores 238,240 respectively defined within the upstanding supports 210,212 as shown in FIGS. 20, 21, 24, and 25 so as to fixedly maintain the guide rods 116,118 within their respective sockets 226, 228. It is to be noted further, however, that the aforenoted structural difference defined between the sockets 226,228 serves an important part in connection with a unique and novel mounting system of the guide rods 116,118, and the associated driven insertion tool section 16 and the insertion tool driving assembly 18, upon the base fixture or framework 12.

More particularly, as can be further appreciated from FIGS. 29 and 30, a peripheral or external surface region of the lower end tip portion of the guide rod 116 is flat or planar as at 242, the bottom surface region of the lower end tip portion of the guide rod 118 is provided with a recessed detent 244, and as illustrated within FIGS. 1 and 3, the upstanding support 212 is provided with a spring-biased plunger 246 which projects upwardly through the bottom wall of the socket 228 so as to be engaged within the recessed detent 244 of the guide rod 118. Consequently, when the driven insertion tool section 16 and the insertion tool driving assembly 18 are to be mounted upon the base fixture or framework 12, the set screws 234,236 are premounted within the side walls of the upstanding supports 210,212, the lower end portion of the guide rod 116 is axially inserted into the socket 226 of the upstanding support 210 in a predetermined angular orientation or phase such that the flat or planar portion 242 thereof is able to bypass the set screw 234, and upon being fully inserted within the socket 226, the entire insertion tool section-insertion tool driving assembly 16–18 is then rotated through an angular extent of 90° so as to effectively insert the lower end portion of the guide rod 118 through the open rear wall portion of the socket 228 of the upstanding support 212. As a result of such an angular or pivotal movement of the entire insertion tool section-insertion tool driving assembly 16–18, the set screw 234 will now be engaged within the annular recessed portion 230 of the guide rod 116 thereby effectively locking the guide rod 116 within the socket 226. In a similar manner, upon insertion of such lower end portion of the guide rod 118 within the socket 228 as a result of the aforenoted angular or pivotal rotation of the entire insertion tool section-insertion tool driving assembly 16–18, the annular recessed portion 232 of the guide rod 118 will operatively cooperate or mate with the set screw 236 so as to likewise axially lock the guide rod 118 within the socket 228 of the upstanding support 212, and still further, the engagement of the spring-biased plunger 246 with the recessed detent 244 of the guide rod 118 effectively locks the guide rod 118 within the socket 228 of the upstanding support 212 with respect to any angular withdrawal of the guide rod 118 from the socket 228.

In order to dismount or disassemble the entire insertion tool section-insertion tool driving assembly 16–18 from the base fixture or framework 12, the aforenoted movements are simply conducted in a reverse order. It can therefore be appreciated that this assembly and disassembly mode of operation of the insertion tool section-insertion tool driving assembly 16–18 with respect to the base fixture or framework 12 is simpler and easier than if the insertion tool section-insertion tool driving assembly 16–18 were to be axially inserted into the base fixture of framework 12 because, for example, both of the set screws 234,236 would have to be threadedly engaged and disengaged with respect to their respective upstanding supports 210,212 each time an insertion tool section-insertion tool driving assembly 16–18 was to be mounted upon or dismounted from the base fixture of framework 12. On the other hand, by means of the present invention, the insertion tool section-insertion tool driving assembly 16–18 only needs to have one end thereof axially inserted within the upstanding support 210 whereupon the assembly 16–18 is then rotated until the other end thereof is angularly latched or locked within the upstanding support 212 so as to achieve the mounting of the insertion tool section-insertion tool driving assembly 16–18 upon the base fixture or framework 12, and conversely, the assembly 16–18 need only be rotated so as to be unlatched or unlocked from the upstanding support 212 and then axially withdrawn from the upstanding support 210 in order to quickly achieve the dismounting or disassembly of the insertion tool section-insertion tool driving assembly 16–18 from the base fixture or framework 12.

Continuing further, and in view of the fact that at this point in time, that is, when the insertion tool section-insertion tool driving assembly 16–18 has only been mounted upon the base fixture or framework 12 such that the three-chamber insertion tool driving assembly 18 has not as yet been actuated, then the punch or die set holder 132 is disposed at its elevated position with respect to the base fixture or framework 12 upon which the electrical connector 14 is mounted. In order to therefore further ensure that the aforenoted angular positioning of the entire insertion tool section-insertion tool driving assembly 16–18 was properly completed and achieved whereby the array of insertion dies or punches 174 will in fact be properly disposed or aligned with the electrical contact members of the electrical connector 14 so as to in fact properly insert the electrical wires into the electrical connector 14 when the three-chamber insertion tool driving assembly 18 is actuated, an additional safety mechanism is provided upon the insertion tool 10 of the present invention. More particularly, as can be seen from FIGS. 1, 3, 20, 21, and 23, the upstanding support 210 is provided with an upstanding finger or tooth 248 within a corner region thereof, and as can be seen from FIGS. 12 and 14, the punch or die set holder 132 is correspondingly provided with a vertically oriented recess or socket 250 at a predetermined angular position B thereof. Therefore, when the three-chamber insertion tool driving assembly 18 is actuated so as to vertically lower the punch or die set holder 132 in order to cause the array of insertion dies or punches 174 to insert the electrical wires into the electrical connector 14, the upstanding tooth or finger 248 of upstanding support 210 can only be inserted into the recess or socket 250 of the punch or die set holder 132 if the entire insertion tool section-insertion tool driving assembly 16–18 was in fact properly mounted and fixed upon the base fixture or framework 12 as a result of the aforenoted angular or pivotal mounting movement of the assembly 16–18 with respect to the fixture or framework 12.

With reference now being made to FIGS. 2 and 31–34, the tool 10 of the present invention is further provided with a unique and novel mounting system for the electrical connector 14 by means of which not only is the electrical connector 14 fixedly and accurately positioned or located in a laterally immobilized state upon the fixture or framework 12, but in addition, means are provided in conjunction with the electrical connector 14 for establishing external electrical connections to, for example, testing equipment by means of which the integrity of the electrical connections formed within the electrical connector 14, as a result of the installation of the electrical wires therewithin, can be verified. More particularly, a first support component 252 is disclosed within FIGS. 31 and 32, and as can be appreciated from FIG. 2, the first support component 252 has a substantially L-shaped cross-sectional configuration comprising a vertically upstanding central portion 254 and a horizontally projecting central portion 256. The vertically upstanding central portion 254 has a horizontal array of apertures 258 defined therein for receiving a plurality of locator pins 260 which project outwardly from the forward face of the upstanding central portion 254 so as to respectively engage a plurality of grooves, not shown, defined within the rear surface portion of the electrical connector 14 whereby such structural interaction between the locator pins 260 and the grooves of the electrical connector 14 effectively serve as a first means for precisely locating, as well as laterally immobilizing or stabilizing, the disposition of the electrical connector 14 with respect to the base fixture or framework 12 when the electrical connector 14 is mounted upon the base fixture or framework 12.

In a somewhat similar manner, it is seen that the horizontally projecting central portion 256 of the first support component 252 is provided with a horizontally extending recessed slot 262 within which a first side of an electrical pin header 264 is adapted to be seated as can best be appreciated from FIG. 2. A plurality of apertures 266 are also provided within the slotted region 262 for accommodating a plurality of set screws, not shown, which are adapted to respectively engage laterally spaced grooves, also not shown, formed within the first side of the electrical pin header 264 whereby the electrical pin header 264 is precisely located with respect to, as well as being laterally immobilized and stabilized upon, the first support component 252. As can be similarly seen from FIGS. 33 and 34, a second support component 268, which has a substantially rectangular parallelepiped configuration, is also provided with a horizontally extending recessed slot 270 within which a second side of the electrical pin header 264 is adapted to be seated as can best be appreciated from FIG. 2. A plurality of apertures 271 are also provided within the slotted region 270 for accommodating a plurality of set screws, not shown, which are adapted to respectively engage laterally spaced grooves, also not shown, formed within the opposite second side of the electrical pin header 264 so as to likewise precisely locate, as well as laterally immobilize and stabilize the electrical pin header 264. It is thus further appreciated that, from an overall structural assembly point of view, the first and second support components 252,268 cooperate together in connection with the mounting of the electrical pin header 264 and the electrical connector 14 upon the base fixture or framework 12.

It is additionally seen that the electrical pin header 264 comprises a plurality of vertically oriented pins which are mounted at substantially vertically central regions thereof such that first sections 263 of the pins project above the header 264 while second sections 265 of the pins project below the header 264 as best seen in FIG. 2. In this manner, the upwardly extending pin sections 263 are adapted to engage suitable apertures, not shown, formed within the electrical connector 14 so as to therefore precisely locate as well as laterally immobilize and stabilize, the electrical connector 14 when the latter is mounted within the base fixture or framework 12, while the downwardly extending pin sections 265 provide electrical connections to external electrical circuit testing apparatus, not shown, by means of which the propriety or integrity of the electrical connections defined between the electrical wires installed upon the electrical connector 14, and the electrical contact members of the electrical connector 14, can be verified.

Figure 25:
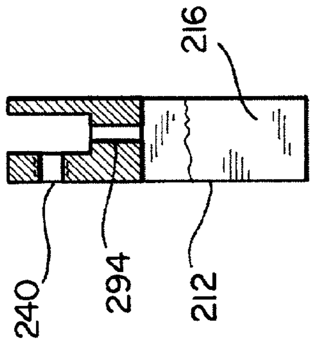
FIG. 25 is a front elevational view, partly in cross-section, of the upstanding support shown in FIG. 24.
Figure 21:
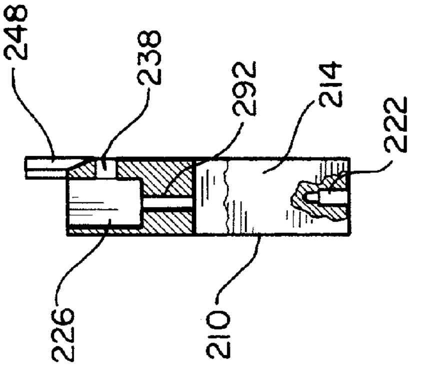
FIG. 21 is a front elevational view, partly in cross-section, of the upstanding support shown in FIG. 20.
Figure 19:
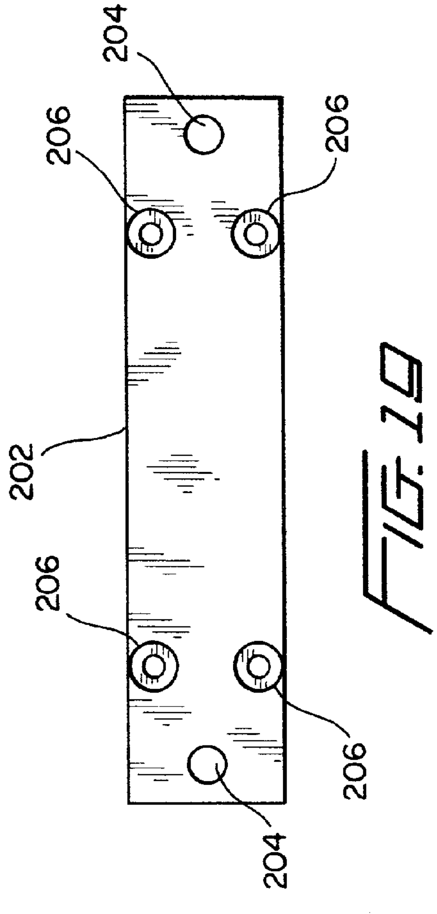
FIG. 19 is a top plan view of the base fixture or framework support plate.
Figure 31:
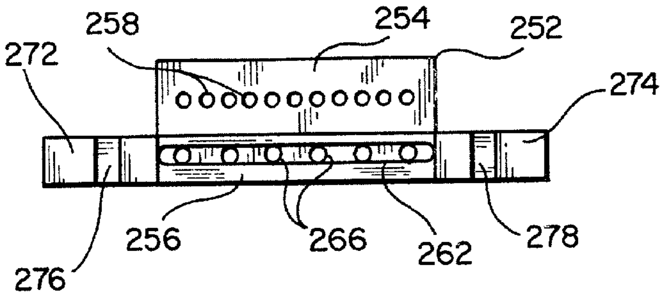
FIG. 31 is a front elevational view of a first support component for mounting the electrical connector and an electrical pin connection header thereon.
Figure 32:
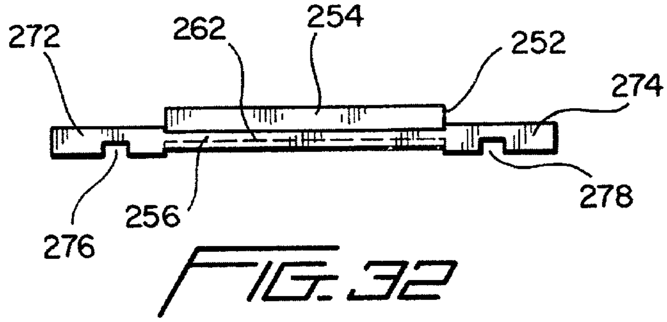
FIG. 32 is a top plan view of the first electrical connector-electrical pin connection header support component disclosed within FIG. 31.

In order to in fact secure the first and second support components upon the base fixture or framework 12 so that they can in fact structurally cooperate together, it is further seen that the first support component 252 is provided with a pair of mounting bracket sections 272,274 which extend in opposite directions away from the central slotted region 262, and that each one of the mounting bracket sections 272,274 is respectively provided with a substantially rectangularly configured recessed region or vertically oriented slot 276, 278. In a similar manner, the second support component 268 is provided with a pair of mounting bracket sections 280,282 which extend in opposite directions away from the central slotted region 270, and each one of the mounting bracket sections 280,282 is respectively provided with a substantially rectangularly configured recessed region or vertically oriented slot 284,286. Accordingly, when the first and second support components 252,268 are mated together, the outwardly extending mounting bracket sections 272 and 282 will be disposed together within the slotted or channel portion 218 of the upstanding support 210 while the mounting bracket sections 274 and 280 will be similarly disposed together within the slotted or channel portion 220 of the upstanding support 212. In addition, the vertically oriented slots 276,286 of the mounting bracket sections 272, 282, as well as the vertically oriented slots 278,284 of the mounting bracket sections 274,280, together form substantially square-shaped apertures through which suitable bolt fasteners 288,290, as seen in FIGS. 1–3, can be disposed for threaded engagement within bores 292,294 respectively formed within the upstanding supports 210,212 as shown in FIGS. 21 and 25.

In connection with a last unique and novel feature of the tool 10 of the present invention, a cutter blade element 296 is adapted to be pivotally mounted upon the base fixture or framework 12 so as to be disposed immediately adjacent to, and in abutment with, the electrical connector 14 mounted upon the base fixture or framework 12. In this manner, the cutter blade element 296 is disposed in a position which enables the cutter blade element 296 to operatively cooperate with the cutter die or element 176 fixedly mounted upon the punch or die set holder 132 when the punch or die set holder 132 is driven vertically downwardly by means of the three-chamber driving assembly 18 including piston rod 44. More particularly, as can best be seen from FIGS. 2 and 35–37, the cutter blade element 296 is seen to comprise an upper blade body portion 298 characterized by means of a front vertically oriented planar surface 300, and a forwardly projecting knife edge 302 for operatively cooperating with the cutter die or element 176 in order to perform a cutting operation in connection with the termination of the electrical wires inserted into the electrical connector 14 when the particular electrical connector 14 comprises an end connector. Opposite lateral sides of the cutter blade element 296 are respectively provided with lug portions 304,306 within which a pair of non-threaded through-bores 308,310 are respectively defined. A pair of bolts 312,314, as best seen in FIGS. 1 and 3, have their threaded shank portions respectively mounted within threaded bores 316,318 respectively defined within the upstanding supports 210,212, however, the tip portions 320,322 of the bolts 312,314 are non-threaded so as to serve as trunnions upon which the non-threaded lug portions 304,306 are able to pivot freely.

In order to normally maintain the cutter blade element 296 at its operatively cooperative cutting position with respect to the electrical connector 14 and with respect to the cutter die or element 176, the rear surface of the upper blade body portion 298 of the cutter blade element 296 is provided with a recessed region or pocket 324 within which the head 326 of a shoulder bolt 328 is adapted to be disposed as best shown in FIG. 2. The shank portion 330 of the bolt 328 is adapted to pass through an aperture 332 formed within the central portion of a cutter blade retention holder 334, which is shown in detail in FIG. 38, and the threaded end of the bolt 328 is adapted to be threadedly mated with a nut 336. A coil spring 338 is disposed around the shank 330 of the bolt 328 so as to be interposed between an interior surface portion of the cutter blade retention holder 334 and the head 326 of the bolt 328, and in this manner, the biasing force of the spring 338 causes the head 326 of the bolt 328 to normally be disposed within the recessed region or pocket 324 of the cutter blade element 296 so as to normally bias the cutter blade element 296 into abutment with the electrical connector 14 and thereby, in turn, properly position the knife edge portion 302 of the cutter blade element 296 with respect to the electrical connector 14 and the downwardly moving cutter die or element 176. A notched portion 340 of the cutter blade element 296 integrally interconnects the planar surface 300 and the forwardly projecting knife edge 302, and it is seen that the upper region of the notched portion 324 comprises an inclined or chamfered surface 342.

Figure 38:
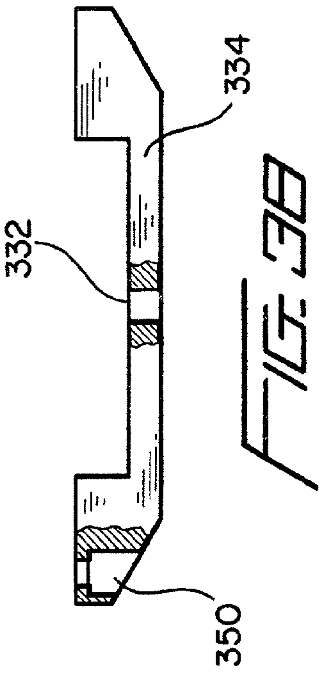
FIG. 38 is a top plan view of a cutter blade retention holder for maintaining the cutter blade element of FIG. 36 at its cutting position.

In this manner, when an end-type electrical connector 14 is initially inserted or installed upon the base fixture or framework 12, a lowered chamfered portion 344 of the electrical connector 14 can interface or interact with the forwardly projecting knife edge portion 302 of the cutter blade element 296 so as to cause the cutter blade element 296 to pivot in the counterclockwise direction as viewed in FIG. 2 against the biasing force of coil spring 338 so as to permit the insertion or installation of the electrical connector 14 upon the base fixture of framework 12. In a similar manner, at the conclusion of the performance of the electrical wire installation and termination operation upon the electrical connector 14, an upper body surface portion 346 of the electrical connector can likewise interface or interact with the chamfered surface portion 342 of the cutter blade element 296 so as to again cause the cutter blade element 296 to be pivoted in the counterclockwise direction away from the electrical connector 14 and against the biasing force of the coil spring 338 whereby the electrical connector 14 can in fact be easily removed from the base fixture or framework 12. It is noted further in connection with the cutter blade element 296 that the same comprises an arcuately configured cut-out region 348 defined within the lower edge region of the upper blade body portion 298. This cut-out region 348 is uniquely provided upon the cutter blade element 296 so as to permit cut or terminated pieces of the electrical wires being inserted within the electrical connector 14 to freely fall therethrough so as not to tend to accumulate and therefore not present any jamming or blockage with respect to the insertion and cutting movements of the insertion and cutting dies 174,176. In order to mount the cutter blade retention holder 334 upon the base fixture or framework 12, it is seen that the opposite ends of the cutter blade retention holder 334 are provided with a pair of bores 350, only one of which is shown in FIG. 38, through which a pair of shoulder bolts 352 are inserted for threaded engagement within threaded bores 354,356 defined within the rear surface portions of each one of the upstanding supports 210,212.

Thus, it may be seen that in accordance with the teachings and principles of the present invention, there has been developed and disclosed a new and improved installation, insulation displacement, and terminating power tool, for inserting electrical wires into, and for electrically connecting the electrical wires to electrical contact members disposed within, an electrical connector, wherein, briefly, the power tool comprises a three-chamber pneumatic driving section for developing an enhanced level of driving force necessary for inserting and terminating the electrical wires into and upon the electrical connector, a quick-release mechanism for mounting a punch or die set holder upon the driving section so as to enable the quick exchange or replacement of the particular punch or die set, a quick insertion system for mounting the driving section-punch or die set holder assembly upon the base fixture or framework, and primary and secondary means for accurately positioning both the electrical connector and an associated pin header upon the base fixture or framework wherein the pin header is also used for integrity verification of the electrical circuits defined between the installed electrical wires and the electrical contact members of the electrical connector.

Obviously, many variations and modifications of the present invention are possible in light of the above teachings. It is therefore to be understood that within the scope of the appended claims, the present invention may be practiced otherwise than as specifically described herein.

What is claimed is:

1. A tool for inserting a plurality of electrical wires into an electrical connector for mating with a plurality of electrical contact members fixedly mounted within the electrical connector, comprising:

a base fixture upon which the electrical connector is to be installed;

an insertion die holder upon which a set of insertion dies is mounted for encountering and forcing the plurality of electrical wires into the electrical connector;

a driving assembly for moving said insertion die holder toward said base fixture so as to cause said set of insertion dies mounted upon said insertion die holder to force the plurality of electrical wires into the electrical connector and mate with the electrical contact members of the electrical connector; and means always immovably mounted upon said base fixture for engaging the electrical connector so as to precisely locate and laterally immobilize the electrical connector upon said base fixture when the electrical connector is inserted onto said base fixture such that said set of insertion dies can accurately insert the electrical wires into the electrical connector.

2. The tool as set forth in claim 1, wherein:

said means always immovably mounted upon said base fixture for engaging the electrical connector so as to precisely locate and laterally immobilize the electrical connector upon said base fixture comprises a plurality of locator pins for engaging grooved sections of the electrical connector.

3. The tool as set forth in claim 1, wherein:

said means always immovably mounted upon said base fixture for engaging the electrical precisely locate and laterally immobilize the electrical connector upon said base fixture comprises a header having a plurality of pins wherein first portions of said plurality of pins operatively engage the electrical connector.

4. The tool as set forth in claim 2, wherein:

said plurality of pins of said header comprise second portions for electrical connection to testing equipment for verifying the fact that proper electrical connections between the electrical wires and the electrical contact members of the electrical connector have been achieved.

5. The tool as set forth in claim 1, further comprising;

a retainer mounted upon said insertion die holder for engaging and retaining the electrical connector upon said base fixture while said set of insertion dies are being moved toward the electrical connector during insertion of the electrical wires into the electrical connector, and for engaging and retaining the electrical connector upon said base fixture while said set of insertion dies are being moved away from the electrical connector after said set of insertion dies have inserted the electrical wires into the electrical connector.

* * * * *